O. L. LEWIS.
SUPPORT AND DRIVING MECHANISM FOR ADJUSTABLE DRIVE WHEELS OF TRACTORS.
APPLICATION FILED JULY 28, 1920.

1,386,123.

Patented Aug. 2, 1921.

Otto L. Lewis, INVENTOR.

UNITED STATES PATENT OFFICE.

OTTO LEROY LEWIS, OF HOUSTON, TEXAS.

SUPPORT AND DRIVING MECHANISM FOR ADJUSTABLE DRIVE-WHEELS OF TRACTORS.

1,386,123.     Specification of Letters Patent.     Patented Aug. 2, 1921.

Application filed July 28, 1920. Serial No. 399,600.

*To all whom it may concern:*

Be it known that I, OTTO LEROY LEWIS, a citizen of the United States, and a resident of Houston, in the county of Harris and State of Texas, have invented a new and useful Improvement in Supports and Driving Mechanism for Adjustable Drive-Wheels of Tractors, of which the following is a specification.

My present invention relates generally to the final drives of tractors and more particularly to the support and driving means of tractor wheels capable of adjustment to vary the clearance underneath or above the tractor in cultivating, plowing and similar soil-working operations.

The invention is more particularly designed to provide a drive and support for tractor wheels whose axes are offset from and parallel with the drive shafts of the tractor and whose support in connection with the tractor is such that the wheel supports may be swung around the axis of the vehicle drive shaft in order to vary the spacing between the vehicle body and the wheel base for various purposes including the adjustment of the underneath and overhead clearance as well as to permit of dropping one wheel in a furrow and maintaining the machine as a whole in an approximately level position.

The primary object of the invention is the provision of a simple, practical, efficient arrangement, of a durable nature permitting the same tractor to operate successfully in orchard cultivation where the overhead clearance must be such as to enable passage of the tractor beneath overhanging branches, and in corn cultivation or the cultivation of similar crops where considerable underneath clearance is imperative particularly during the final cultivation.

In the accompanying drawings illustrating the present invention and forming a part of this specification—

Figure 1:
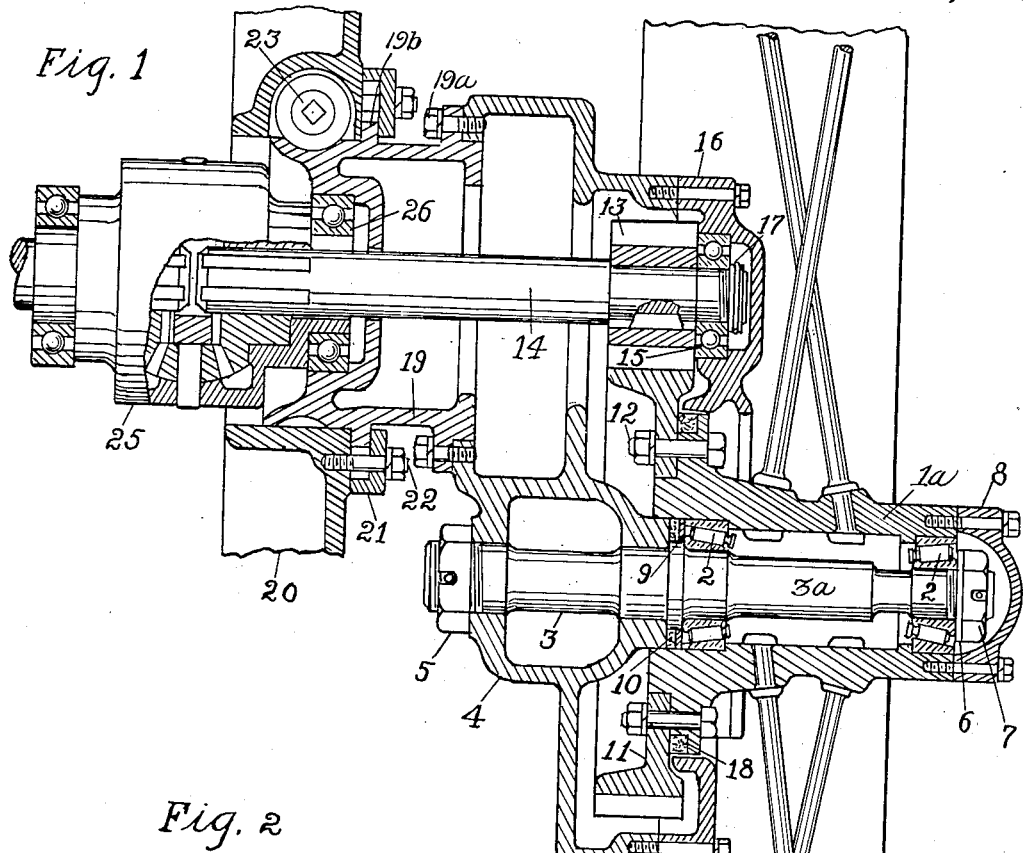
Figure 2:
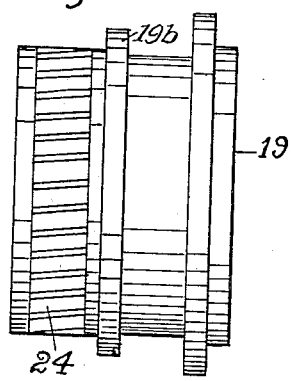

Figure 1 is a vertical transverse section through the parts constituting my invention, and Fig. 2 is a side elevation of the rotatably adjustable cylinder removed.

Referring now to these figures I have shown the tractor drive wheel at 1, in the present instance having its tubular hub $1^a$ rotatable upon bearings 2 at the inner and outer ends of the spindle $3^a$ of the wheel shaft 3, the latter being secured at its inner portion by virtue of its extension through lower apertures in a wheel shaft support 4, and the use of a locked nut 5 threaded upon the inner end of the shaft. The wheel hub $1^a$ and its bearings 2 are held in place by a washer 6 and a locked nut 7, the latter threaded upon the outer end of the spindle $3^a$ and inclosed within a cap 8 secured to the outer end of the hub $1^a$ so as to retain lubricant within the hub and exclude dust and dirt therefrom. The inner portion of the hub rotatably telescopes a portion of the wheel support 4 at its inner end and has therein a metal washer 9 and a felt ring 10 which thus close the inner end of the space within the hub $1^a$ around the shaft spindle $3^a$.

Around this inner end of the spindle and within the outer open side of the wheel shaft support, a gear wheel 11 is securely fastened to an inner flange of the hub by means of bolts 12, this gear meshing with a smaller gear 13 mounted upon the outer end of one of the laterally outstanding tractor drive shafts 14. The extreme outer end of the shaft 14 beyond its gear 13, is supported by an anti-friction bearing 15 mounted in a portion of a cover plate 16 bolted to the wheel support 14 and closing its outer open side, this bearing being held in place by a nut 17 threaded on the outer end of shaft 14. The cover plate 16 has a lower opening in which the flanged inner portion of the hub $1^a$ rotates and with which a fiber-like washer 18 carried by the hub flange coöperates to prevent entrance of dust, dirt and other foreign matter within the wheel shaft support.

As will be seen particularly from Fig. 1 the wheel shaft support 4 is in the nature of a hollow elongated casing whose outer side is open throughout and whose inner side has an opening at its upper or inner end concentric with the drive shaft 14 to receive the outer end of a connecting cylinder 19 rigidly connected thereto by an annular series of bolts $19^a$. The opposite end of this connecting cylinder 19 extends in rotatable relation within the bearing opening of a rigid support 20 which may be a part of the transmission housing of the vehicle and which at a point adjacent to the top of the connecting cylinder, has a tangential bore for the reception of a rotatable or adjusting worm 23 engaging the worm wheel 24 with which the inner portion of the connecting cylinder is provided. Around the outer end of its bearing opening receiving the inner portion of the connecting cylinder 19, the rigid support 20 has a confining ring 21 preferably in semi-cylindrical sections and adapted to lap an annular flange 19ᵇ of the connecting cylinder 19 to hold the latter against displacement, an annular series of bolts 22 being utilized to secure the confining ring or rather the sections thereof to the rigid support 20.

It will be understood that the inner end of the drive shaft 14 is connected through a differential 25 with the driving parts of the vehicle and it is obvious that the wheel support is rotatable around the axis of the drive shaft by virtue of the connecting cylinder 19 and the means of rotating the cylinder so that the distance between the axis of the drive shaft and the base of the wheel 1 can be varied during the shifting of the wheel shaft 3 to either side of the vertical plane of the drive shaft 14. This obviously permits of dropping one of the drive wheels into a furrow and still maintaining the tractor frame in approximately level position, and also obviously permits of adjusting the underneath and overhead clearance for the purposes previously described.

The structure by which these advantages are attained is also obviously such as to exclude dust and dirt from the working parts, especially those within and associated with the adjustable supporting frame 4 of the wheel shaft, the inner end of the connecting cylinder 19 having an inner support for a bearing 26 at the respective end of the differential housing 25.

As shown I have employed what is known as a dead shaft for the wheel, the hub of the latter rotating with respect to the relatively stationary shaft 3, but it is obvious that I may with equal facility utilize the rotating shaft, connecting the gear 11 directly to the shaft and securely fastening by keys or otherwise the wheel hub to the shaft spindle instead of connecting the gear to the rotating hub as shown and described. These changes as well as certain others are contemplated by the invention and with other changes reserved to the extent that they fall within the terms of the claims.

I claim:—

1. An apparatus of the character described including a drive shaft, a stationary support having a bearing opening around the drive shaft, a connecting cylinder through which the drive shaft extends, having its inner end disposed in the bearing opening of the support and rotatably confined in connection with the support, a wheel shaft supporting frame secured to the outer end of the cylinder and having a bearing for the outer end of the drive shaft, a wheel shaft mounted in said supporting frame in offset parallel relation to the drive shaft, a wheel mounted on said wheel shaft, a gearing within the said supporting frame for driving the wheel from said drive shaft.

2. An apparatus of the character described, including a drive shaft, a stationary support having a bearing opening around the drive shaft, a connecting cylinder through which the drive shaft extends, having its inner end disposed in the bearing opening of the support and rotatably confined in connection with the support, a wheel shaft supporting frame secured to the outer end of the cylinder and having a bearing for the outer end of the drive shaft, a wheel shaft mounted in said supporting frame in offset parallel relation to the drive shaft, a wheel mounted on said wheel shaft, gearing within the said supporting frame for driving the wheel from said drive shaft, the said inner end of the connecting cylinder having a worm wheel, and an adjusting worm mounted in the said stationary support and engaging the worm wheel, as described.

3. An apparatus of the character described, including a drive shaft, a member rotatable around the drive shaft and through which the latter extends having supporting connections preventing its movement lengthwise of the shaft, means for rotating said member and securing the same in rotatably adjusted position, a wheel shaft supporting frame secured to said member, having a bearing for the outer portion of the drive shaft, a wheel shaft supported in said frame in offset parallel relation to the drive shaft, a wheel on the said wheel shaft, and driving connections for the wheel disposed within the said supporting frame and extending from the drive shaft.

4. An apparatus of the character described, including a drive shaft, a wheel supporting frame adjustable around the drive shaft at one end and inclosing the latter, a wheel shaft mounted in the frame in spaced parallel relation to the drive shaft and having a spindle projecting beyond the outer end of the drive shaft, a wheel having its hub rotatably mounted on the spindle and provided with an inner flange, a gear secured to the flange within the supporting frame, a gear secured on the drive shaft and engaging the wheel hub gear, said wheel supporting frame being open at its outer side and a cover plate secured to close the said open side of the frame and having an opening receiving the flange of the wheel hub therein.

OTTO LEROY LEWIS.